Jan. 22, 1963　　　R. E. KIKENDALL　　　3,074,425
SNAP ACTING SAFETY VALVE
Filed March 20, 1959
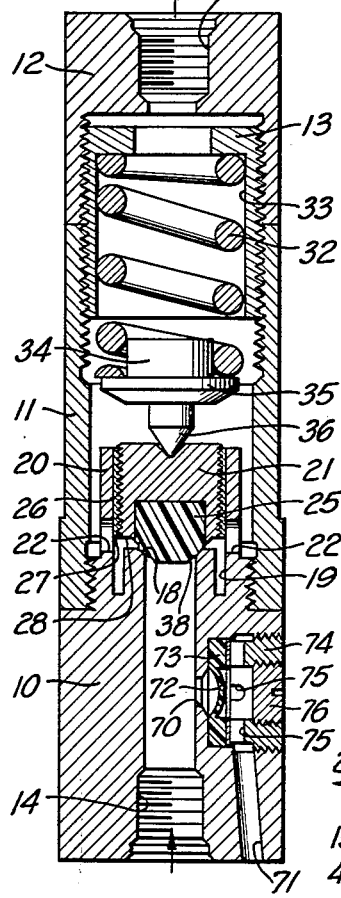
FIG. 1.
FIG. 2.
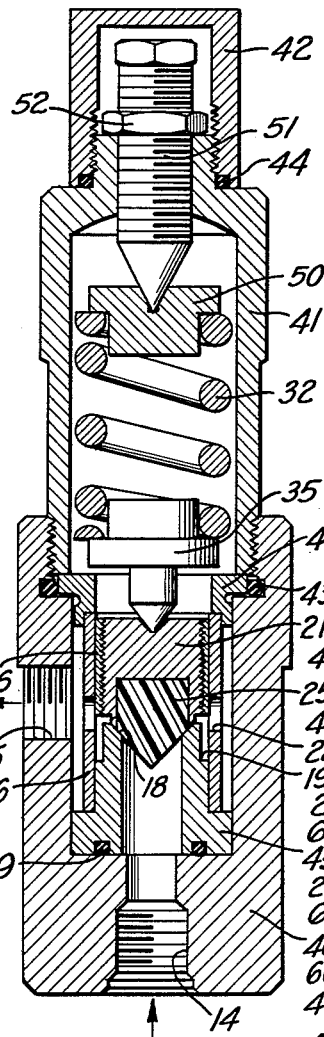
FIG. 3.
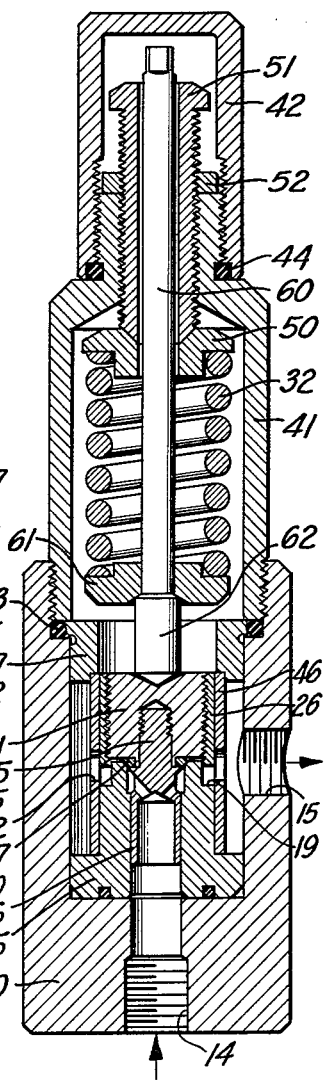
FIG. 4.
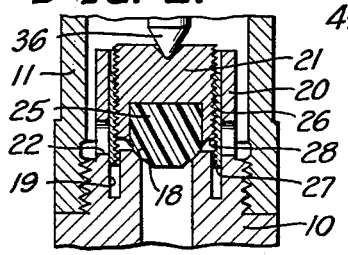
FIG. 5.
INVENTOR
RALPH E. KIKENDALL
BY HIS ATTORNEYS
HARRIS, KIECH, RUSSELL & KERN

United States Patent Office 3,074,425
Patented Jan. 22, 1963

3,074,425
SNAP ACTING SAFETY VALVE
Ralph E. Kikendall, 1734 S. Del Mar Ave.,
San Gabriel, Calif.
Filed Mar. 20, 1959, Ser. No. 800,835
6 Claims. (Cl. 137—477)

This invention relates to valves and, in particular, to safety or poppet type valves.

It is an object of the invention to provide a safety valve that is very quick acting, moving from the closed to the full open condition and from full open to closed in a very short time. Another object of the invention is to provide such a valve which may be operated at extremely high pressures, such as pressures in the order of 15,000 lb. per square inch and higher, while being extremely sensitive and having essentially snap action for movement from closed to full open condition for a change of pressure of only a few pounds per square inch.

It is an object of the invention to provide a safety valve wherein the poppet or moving member has two working areas exposed to the inlet fluid pressure with the smaller area so exposed when the poppet is seated and the valve closed, and with the larger area being exposed immediately upon cracking of the valve, providing a large increase in force and a rapid and complete opening of the valve. Another object is to provide a poppet having an annular projection providing a soft seat for producing bubble tight seals.

It is an object of the invention to provide a safety valve wherein the outlet port or ports are partially or totally closed when the valve is first cracked to eliminate or reduce the loss of valve operating forces due to fluid flow through the outlet ports, thereby providing an extremely fast acting valve. A further object is to provide such a valve wherein the poppet carries control means for producing throttling of fluid flow through the outlet port with the amount of throttling being reduced as the valve opens. A further object of the invention is to provide such a valve wherein the outlet port may be substantially closed during the initial movement of the poppet so that there is no fluid flow through the outlet port and the total pressure of the inlet fluid is available for valve operation.

It is an object of the invention to provide a fast acting safety valve in which the poppet carries an external sleeve disposed around the valve seat and the poppet working areas for closing and/or throttling the outlet ports. A further object is to provide such a structure wherein the external sleeve is adjustable relative to the poppet for changing the operating characteristics of the valve.

It is an object of the invention to provide a snap acting safety valve of the type discussed above that is compact in design, simple to manufacture and assemble, and easily adjustable for various operating conditions. A further object is to provide such a structure wherein the valve cap is joined to the valve body by an internal collar, which collar also retains the valve closing spring and which may be adjusted to vary the spring pressure while still serving to couple the housing elements together. Another object is to provide such a valve which may have a rupture disc built integral with the snap acting valve.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a sectional view of a preferred form of the invention;

FIG. 2 is a sectional view of a portion of the unit of FIG. 1 with the throttling sleeve in a different position;

FIG. 3 is a sectional view of an alternative form of the invention;

FIG. 4 is a sectional view of another alternative form of the invention; and

FIG. 5 is an enlarged view of a portion of the poppet of FIG. 1.

In the valve of FIGS. 1 and 2, the housing includes a body 10, a sleeve 11 threadedly carried on the body 10, and a cap 12 which abuts the sleeve 11 and is joined thereto by an internally positioned, threaded collar 13. A threaded opening 14 in the body 10 provides for coupling an inlet fluid line to the valve and a similar threaded opening 15 in the cap 12 provides for coupling an outlet fluid line.

The opening 14 serves as an inlet port for the valve and terminates in a conical valve seat 18. An annular groove 19 is provided in the body 10 around the seat 18 and an annular ring 20 is projected upward from the body to serve as a guide for a poppet 21. A pair of openings 22 in the ring 20 provide for fluid flow through the opening 14, over the seat 18 and out the opening 15, the openings 22 serving as outlet ports for the valve. Of course, only one, or three or more such outlet ports may be used if desired.

The poppet 21 is axially slidable within the ring 20 and is preferably provided with a seat engaging plug 25 formed of a flexible, tough material such as nylon, Teflon, Kel-F, Buna-N, or the like, for producing a tight seal at the seat 18 when the valve is closed and for reducing the wear on the seat. The plug 25 preferably has a projecting, annular rib 16 for engaging the seat 18. This rib, being relatively small, is compressed when pressed into contact with the seat and backed up by the remainder of the plug. The structure makes the valve bubble tight even at the extreme operating pressures it is subjected to.

The poppet 21 also carries an external, annular flange which is preferably in the form of a sleeve 26 axially movable relative to the remainder of the poppet, the sleeve or flange serving as a control for fluid flow through the outlet ports 22. In the embodiment of FIGS. 1 and 2, the sleeve 26 is threadedly carried on the main body of the poppet 21 with the external surface of the sleeve also serving as the surface which slidingly engages the ring 20. In FIG. 1, the sleeve 26 is shown with its lower edge 27 flush with the lower surface 28 of the poppet. In FIG. 2, the sleeve 26 has been advanced downward relative to the remainder of the poppet with the lower portion of the sleeve slidingly engaging the outer wall of the groove 19 when the valve is in the closed position.

Means are provided within the housing for urging the poppet 21 downward into engagement with the seat 18. In the embodiment of FIG. 1, a compression spring 32 is positioned within a counterbore 33 in the collar 13 and around a boss 34 of a retainer 35. An extension 36 of the retainer 35 bears against the poppet 21 so that the compression spring 32 urges the poppet into engagement with the valve seat 18. In assembling the valve, the collar 13 is moved axially relative to the sleeve 11 to produce the desired valve operating pressure, after which the cap 12 is mounted on the collar 13. Thus, the collar serves both as an adjustment means for varying the operating point of the valve and as means for holding the housing components together to provide a smooth, compact valve structure.

With the valve closed as shown in FIG. 1, the fluid at the inlet port 14 works against the central portion 38 of the plug 25 which is within the annular seat 18. When the force produced by the inlet fluid pressure working against this area exceeds the force exerted by the spring 32, the poppet 21 will move upward slightly permitting fluid flow over the valve seat. As soon as the valve is cracked, the inlet fluid will exert pressure over the entire lower surface of the poppet, thereby producing a sudden increase in the upward force acting on the poppet which will cause the valve to very rapidly move to the full open position once it is cracked. Since the working area of the poppet exposed to the incoming fluid pressure is considerably smaller when the valve is closed than when it is open, the valve is essentially a snap-acting unit in which a very small pressure change suffices to fully open the closed valve. For example, valves constructed as shown in FIG. 1 have been operated as safety valves to open at pressures in the order of 15,000 lb. per square inch with the valve moving from the fully closed to the full open condition for a pressure change of 50 to 100 lb. per square inch.

The snap action of the valve is further improved by the throttling action produced by the sleeve 26 of the poppet. When the sleeve is positioned as shown in FIG. 1 and the valve is cracked, there is essentially unrestricted fluid flow over the valve seat and laterally outward through the ports 22. Thus, there is some pressure drop at the working area of the poppet due to the flow through the outlet ports. However, when the sleeve 26 is advanced to the position shown in FIG. 2, the ports 22 are substantially sealed even after the valve has cracked open so that the inlet fluid pressure is acting on the larger working area of the poppet, there being no reduction in pressure due to flow through the outlet ports. Thus, an even more rapid upward movement of the poppet is achieved, thereby reducing the pressure differential required to operate the valve. As the poppet moves upward, the lower edge 27 of the sleeve 26 partially uncovers the outlet ports 22 and produces a throttling of the fluid flow therethrough. Further upward movement of the poppet reduces the magnitude of the throttling until the ports are fully open. By suitably positioning the sleeve 26 relative to the remainder of the poppet, the operating characteristics of the valve can be varied to suit various applications. For example, the sleeve may be flush as shown in FIG. 1, producing no throttling, the sleeve may be moved downward with its lower edge 27 above the lower edge of the outlet ports so that there is throttling but no blocking at the time the valve cracks open. Alternatively, the sleeve may be positioned in the groove 19 as shown in FIG. 2, with the amount of projection of the sleeve into the groove controlling how far the poppet has to move upward before the exit ports are partially uncovered.

A rupture disc may be provided integrally with the valve of FIG. 1 when desired. A lateral passage 70 and an approximately axial passage 71 provide an exhaust from the opening 14. The passage 70 is blocked by a rupture disc 72 carried by a disc retainer 73. The disc and retainer are clamped in place by a clamp nut 74. The nut 74 has a plurality of openings 75 through the wall thereof providing communication between the passages 70 and 71 when the disc 72 has ruptured. A plug 76 closes the open end of the nut 74 and permits inspection of the rupture disc.

In the alternative embodiment of FIG. 3, elements identical to those of FIG. 1 are identified by the same reference numerals. The valve housing includes a lower body member 40, an intermediate body member 41 and a cap 42, these units being threadedly engaged with each other with seal rings 43, 44 therebetween. A nozzle 45 is positioned within the body 40, the nozzle having an axial opening therethrough in alignment with the opening 14 and terminating in the valve seat 18. A poppet guide sleeve 46 is positioned around the nozzle 45, being held in place by a ring 47 bearing against the body member 41. The sleeve 46 and the nozzle 45 coact to define the groove 19 into which the poppet sleeve 26 may be extended. A seal ring 49 carried in the lower end of the nozzle 45 provides a seal between the inlet and outlet openings 14, 15. The upper end of the spring 32 bears agaimnst a retainer 50 which in turn engages the lower end of an adjustment screw 51, the screw threadingly engaging the body member 41 and being locked in place by lock nut 52.

In the embodiment of FIG. 4, elements identical to those of the embodiments of FIGS. 1 and 3 are identified by the same reference numerals. A spring guide 60 is positioned in axial bores in the screw 51, the upper spring retainer 50 and a lower spring retainer 61, with the lower retainer 61 engaging an enlarged end 62 of the guide and urging it downward into engagement with the poppet 21. A poppet extension 65 has an upper end threadedly inserted in the poppet body 21 and a lower end 66 slidingly engaging the bore in the nozzle 45, a seat engaging ring 67 of nylon or the like being clamped against the lower surface of the poppet by the extension. The lower end 66 is provided with a central bore and three radial bores communicating therewith for fluid flow from the opening 14 to the valve seat. The sliding engagement of the end 66 with the nozzle 45 serves to maintain the poppet and valve seat in exact alignment, thereby improving the seating action and reducing the leakage in the structure.

The embodiments of FIGS. 3 and 4 operate in the same manner as the embodiment of FIGS. 1 and 2, the poppet having a smaller working area exposed to the inlet fluid pressure when engaging the seat and having a larger working area exposed after moving upward from the seat. Also, the sleeve 26 provides the desired throttling action across the outlet ports 22, with the sleeve being adjustable relative to the remainder of the poppet so that substantial blocking, no blocking or throttling, or intermediate throttling action can be obtained as desired.

Applicant's safety valve provides extremely fast action at relatively high operating pressures and under severe operating conditions. For example, the valve of the invention has been used as a safety valve in handling gaseous helium. With the valve set to open at 6000 p.s.i.g., there is slight leakage noted as the pressure is increased to 5800 p.s.i.g. and the valve is full open at 6000 p.s.i.g. With decreasing pressure, the valve reseats with zero leakage 5800 p.s.i.g.

In another application for handling liquid nitrogen at minus 320° F., the valve was set to open at about 400 p.s.i.g. As the pressure increases, there is slight leakage in the range of 380–390 p.s.i.g. while the valve is full open at 402 p.s.i.g. As the pressure is reduced, the valve reseats with very small leakage at 380 p.s.i.g. and is bubble-tight with zero leakage at 348 p.s.i.g. Thus it is seen that applicant's valve provides extremely close operating tolerances under severe operating conditions while maintaining bubble-tight seals.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a valve, the combination of: a housing having an inlet port, a valve seat, an outlet port, a cylindrical poppet guide, and an annular groove around said seat, with said poppet guide positioned about said seat and groove and having at least one outlet port substantially in lateral alignment with said seat for permitting fluid flow through the valve; a poppet slidably carried in said poppet guide for movement toward and away from said seat, said poppet including a cylindrical sleeve slidingly engaging said guide and projecting into said groove for at least partially blocking said guide outlet port when said poppet engages said seat; and means for urging said poppet into engagement with said seat to block fluid flow through the valve, said poppet having a working area exposed to the inlet fluid pressure for urging said poppet out of engagement with said seat.

2. In a valve, the combination of: a valve body having an inlet port, a valve seat, an outlet port, a cylindrical poppet guide and an annular groove around said seat, the outer wall of said groove comprising an extension of the inner wall of said guide, with said guide positioned about said seat and groove and having at least one outlet port substantially in lateral alignment with said seat; a poppet slidably disposed in said guide for engaging said seat, said poppet having a first working area exposed to the inlet fluid pressure when engaged with said seat and a second larger working area exposed to the inlet fluid pressure when disengaged from said seat, said poppet having an exterior sleeve for slidingly covering at least a portion of said guide outlet port and projecting into said groove when said poppet engages said seat; a cap mounted on said body for enclosing said poppet; and a spring mounted between said cap and said poppet for urging said poppet toward said seat against the force exerted by the inlet fluid pressure.

3. In a valve, the combination of: a valve body having, at one end, an inlet port, a valve seat, an outlet port, a cylindrical poppet guide and an annular groove around said seat, the outer wall of said groove comprising an extension of the inner wall of said guide, with said guide positioned about said seat and groove and having at least one outlet port substantially in lateral alignment with said seat; a poppet slidably disposed in said guide for engaging said seat, said poppet having a first working area exposed to the inlet fluid pressure when engaged with said seat and a second larger working area exposed to the inlet fluid pressure when disengaged from said seat, said poppet having an exterior sleeve for slidingly covering at least a portion of said guide outlet port and projecting into said groove when said poppet engages said seat; a cap abutting the other end of said body to define a valve chamber; a collar positioned within said chamber in threaded engagement with said body and cap at their abutting ends for joining said body and cap; and a spring mounted between said collar and said poppet for urging said poppet toward said seat against the force exerted by the inlet fluid pressure, said collar being movable relative to said body and cap to vary the force exerted by said spring.

4. A valve as defined in claim 3 in which said collar has a flow-throttling opening therethrough, and including first means defining a flow path from said guide outlet port to the spring side of said collar, and second means defining a flow path from the other side of said collar to said valve body outlet port for fluid flow over said valve seat, through said guide outlet port and said throtting opening to said body outlet port.

5. In a valve, the combination of: a valve body having an inlet port, a valve seat, an outlet port, a cylindrical poppet guide, an annular groove around said seat, and an exhaust passage communicating with said inlet port, the outer wall of said groove comprising an extension of the inner wall of said guide, with said guide positioned about said seat and groove and having at least one outlet port substantially in lateral alignment with said seat; a poppet slidably disposed in said guide for engaging said seat, said poppet having a first working area exposed to the inlet fluid pressure when engaged with said seat and a second larger working area exposed to the inlet fluid pressure when disengaged from said seat, said poppet having an exterior sleeve for slidingly covering at least a portion of said guide outlet port and projecting into said groove when said poppet engages said seat; a cap mounted on said body for enclosing said poppet; a spring mounted between said cap and said poppet for urging said poppet toward said seat against the force exerted by the inlet fluid pressure; and a rupture disc clamped in said exhaust passage adjacent said inlet port for blocking said exhaust passage.

6. In a valve, the combination of: a housing having a valve inlet port, a valve seat, a valve outlet port, a tubular poppet guide, and an annular groove around said seat, with said poppet guide positioned about said seat and groove and having at least one guide outlet port for fluid flow past the seat to the valve outlet port; a poppet slidably carried in said poppet guide for movement toward and away from said seat, said poppet having a sleeve slidingly engaging said guide and projecting into said groove for at least partially blocking said guide outlet port when said poppet engages said seat; and means for urging said poppet into engagement with said seat to block fluid flow through the valve, said poppet having a working area exposed to the inlet fluid pressure for urging said poppet out of engagement with said seat.

References Cited in the file of this patent
UNITED STATES PATENTS

| 287,131 | Jarecki | Oct. 23, 1883 |
| 511,650 | Prussman | Dec. 26, 1893 |
| 538,702 | Scheumann | May 7, 1895 |
| 1,370,521 | Desmarteau | Mar. 8, 1921 |
| 2,107,200 | Kennon | Feb. 1, 1938 |
| 2,162,898 | Rotter | June 20, 1939 |
| 2,882,924 | Kleczek | Apr. 21, 1959 |
| 2,917,072 | Saville | Dec. 15, 1959 |

FOREIGN PATENTS

| 227,669 | Switzerland | Sept. 16, 1943 |
| 1,004,561 | France | Nov. 28, 1951 |